Aug. 30, 1938.                W. A. REICH                2,128,715
                       AUTOMATIC REVERSE GEARING
                         Filed Nov. 18, 1935           2 Sheets-Sheet 1

INVENTOR
Walter A. Reich.
BY
ATTORNEY

Aug. 30, 1938.    W. A. REICH    2,128,715
AUTOMATIC REVERSE GEARING
Filed Nov. 18, 1935    2 Sheets-Sheet 2
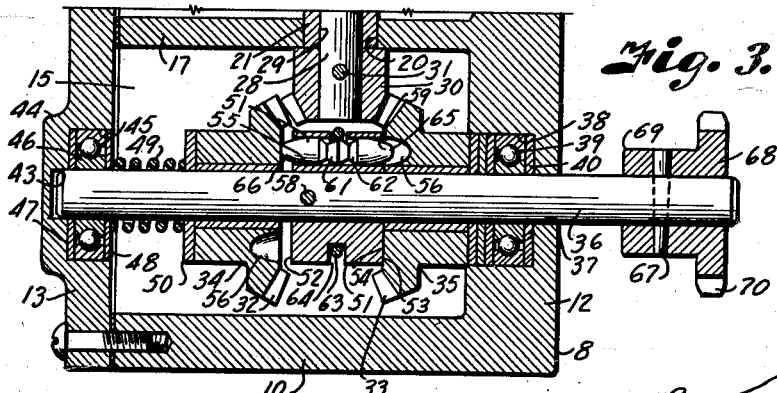
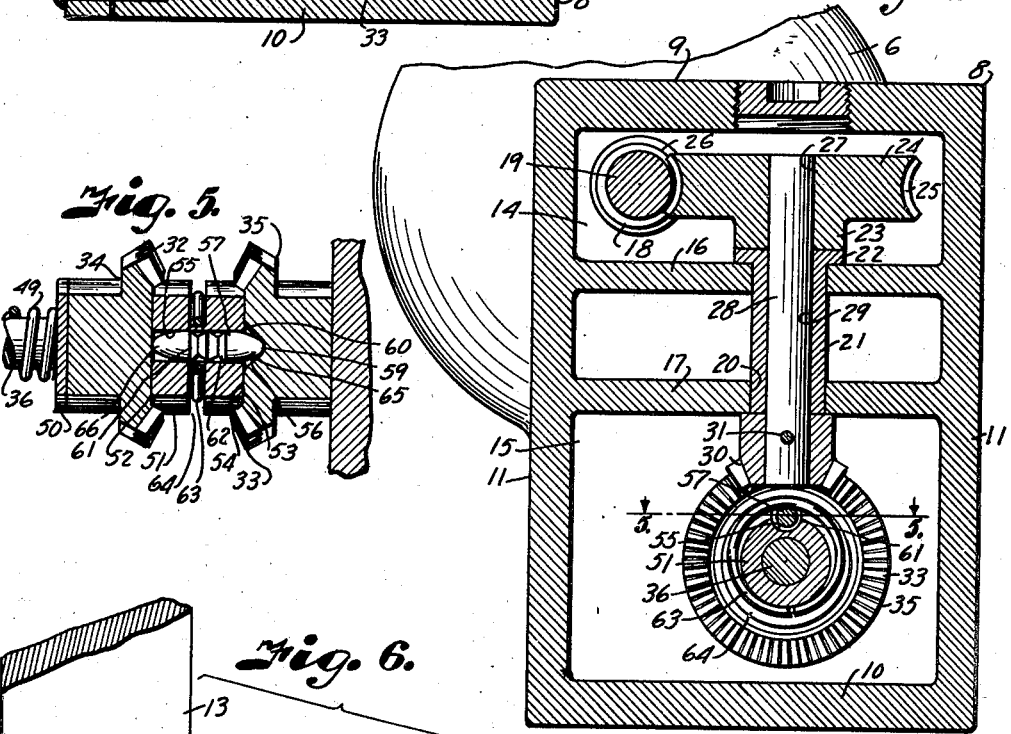
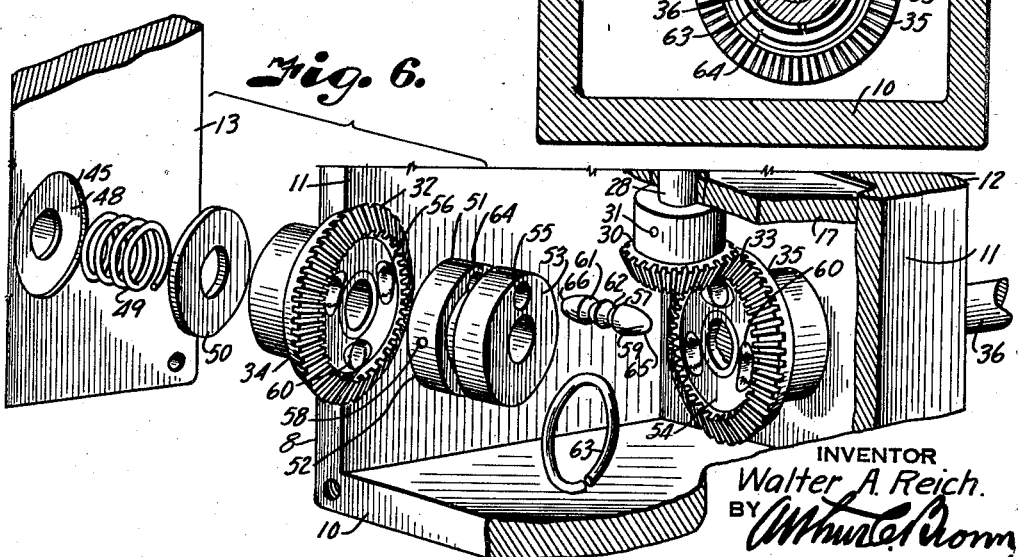
INVENTOR
Walter A. Reich.
BY
ATTORNEY Patented Aug. 30, 1938

2,128,715

UNITED STATES PATENT OFFICE 2,128,715

AUTOMATIC REVERSE GEARING

Walter A. Reich, Kansas City, Mo.

Application November 18, 1935, Serial No. 50,286

13 Claims. (Cl. 74—378)

This invention relates to gear units and more particularly to an automatic reversing gearing which may be applied to a prime mover for alternately driving an object in opposite directions, as, for example, a display device mounted on a track.

The principal objects of the present invention are to provide a reversing gearing of this character which automatically reverses the direction of travel of a driven object to which the gearing is attached; to provide a gearing which is automatically reversed when a driven object to which it is connected engages an obstruction in its path of travel; to provide a gearing which prevents damage to itself and to an obstruction in its path of travel by reason of its automatic reversing characteristics; and to provide a safe, economical and efficient mechanism of this character having durable qualities.

In accomplishing these and other objects of the present invention, I have provided improved details of structure, the preferred form of which is illustrated in the accompanying drawings, wherein:

Fig. 3 is a vertical cross section through the lower end of the gear box, showing the clutch pin in central position.

Fig. 4 is a vertical cross section through the gear box on the line 4—4, Fig. 2, particularly showing the motor drive of the gear.

Fig. 5 is a detail vertical cross section through the beveled gears and clutch collar on the line 5—5, Fig. 4, and showing the clutch pin and one of the clutch pin holes in one of the beveled gears.

Fig. 6 is a detail perspective view showing the parts of my improved gear mechanism in disassembled relation and particularly showing the clutch pin holes in the beveled gears.

Figure 1:
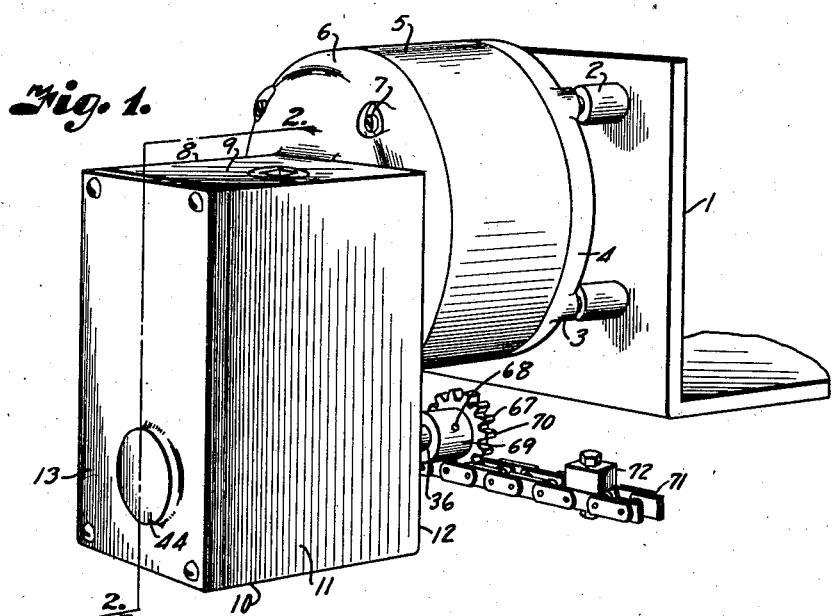
Fig. 1 is a perspective view of a motor connected with a gear box containing a gear unit embodying the features of my invention and showing the gear unit in engagement with a chain.

Referring more in detail to the drawings:

1 designates a motor supporting bracket of any suitable construction and having projecting bosses 2 for engaging lugs 3 on the end cover cap 4 of a motor housing 5. Mounted on the other end of the motor housing is a cover cap 6 having recesses for receiving tie bolts 7 which extend through the motor housing and lugs 3 into the bosses 2 of the bracket to tie the motor and housing thereto.

Formed integrally with the motor housing cover cap 6 is a gear box 8 of generally rectangular shape and having top, bottom, side and end walls 9, 10, 11 and 12, respectively, the outer end of said box being closed by a cover plate 13. An opening, furnished with a removable closure, may also be provided in the top wall 9 for supplying the gear box with lubricants. The gear box is divided into upper and lower gear compartments 14 and 15 by spaced partitions 16 and 17, the upper compartment containing the drive gears including a worm 18 mounted on an extension of the motor armature shaft 19 projecting into the compartment 14 for driving the reversing gears, as later described.

The partitions 16 and 17 are bored as at 20 and fitted with a cylindrical bearing 21, the upper end of which is provided with a flange 22 engaging the upper face of the partition 16 and providing a seat for the face of the hub 23 of a gear 24, the teeth 25 of which mesh with the teeth 26 of the worm pinion 18 fixed on the armature shaft 19 of the motor.

The worm gear has a central bore 27 in which is secured a shaft 28 which extends through the bore 29 of the bearing 21 and projects into the lower compartment 15, a beveled pinion gear 30 being fixed to the projecting end of said shaft as by a pin 31. The teeth of the pinion gear 30 mesh with the teeth 32 and 33 of a pair of beveled driven gears 34 and 35 which are rotatably mounted on a driven shaft 36 sleeved through a bore 37 in the end wall 12 of the gear box. The bore 37 is enlarged on the inner face of the side wall 12 as at 38 to receive a ball bearing 39 in which the shaft is rotatably mounted and which is separated from the gear box by a thrust washer 40. Thrust washers 41 are also provided between the ball bearing and the hub of the gear 35 to always maintain the gear 35 in meshing engagement with the pinion gear 30.

The other end 42 of the driven shaft 36 is seated in a recess 43 in a protuberance 44 of the cover plate 13 of the gear box directly opposite and aligning with the bore 37 in the end wall 12. The recess 43 in the cover plate of the gear box is enlarged as at 45 to a diameter similar to the enlarged bore of the end wall 12 to receive a ball bearing 46 for rotatably mounting the outer end of the driven shaft.

Thrust washers 47 and 48 are provided on the shaft on each side of the bearing, the inner washer separating the bearing 46 from a coil spring 49 sleeved over the shaft 36, one end of which engages the thrust washer 48, and the other end engaging the thrust washer 50 bearing against the outer end of the beveled gear 34 to ordinarily maintain the teeth of the beveled gear 34 in engagement with the teeth of the pinion gear 30.

Sleeved on the shaft 36 between the beveled gears 34 and 35 is a clutch collar 51 of such a length that its end faces 52 and 53 engage the inner faces 54 of the gears, thereby spacing said gears for correct meshing of the teeth thereof with the teeth of the beveled pinion 30. Spaced laterally from the shaft 36 in the clutch collar is a bore 55 extending longitudinally of the collar and adapted to align with spaced recesses 56 in the faces 54 of the gears, three equally spaced recesses being shown in the face of each gear.

Slidable in the bore 55 of the collar is a clutch pin 57 of longer length than the collar so that it projects from said collar to engage in one of the recesses in one of the gears for effecting rotation of the collar with said gear, which is rotated by the beveled pinion 30. The rotation of the clutch collar is imparted to the shaft 36 since the collar is keyed to the shaft by a pin 58 extending transversely therethrough.

One of the important objects of this invention is to reverse the mechanism when the resistance to continued motion reaches a predetermined amount. The reversing is accomplished by the clutch pin 57 engaging a recess in the other gear and in order to make this action automatic I have rounded the ends of the clutch pin as at 59 and beveled the edges of the recesses as at 60 so that the pin may ride out of the recesses when resistance to continued rotation of the clutch collar becomes too great. When the pin has ridden out of a recess of one of the beveled gears, it is necessary to provide for directing the pin into a recess of the other beveled gear and thereafter holding it in said recess until resistance of the clutch collar to continued rotation of the beveled gear again overbalances frictional engagement of the clutch pin in the gear recess to force the pin to ride out of said recess toward the inner face of the opposite gear.

Figure 2:
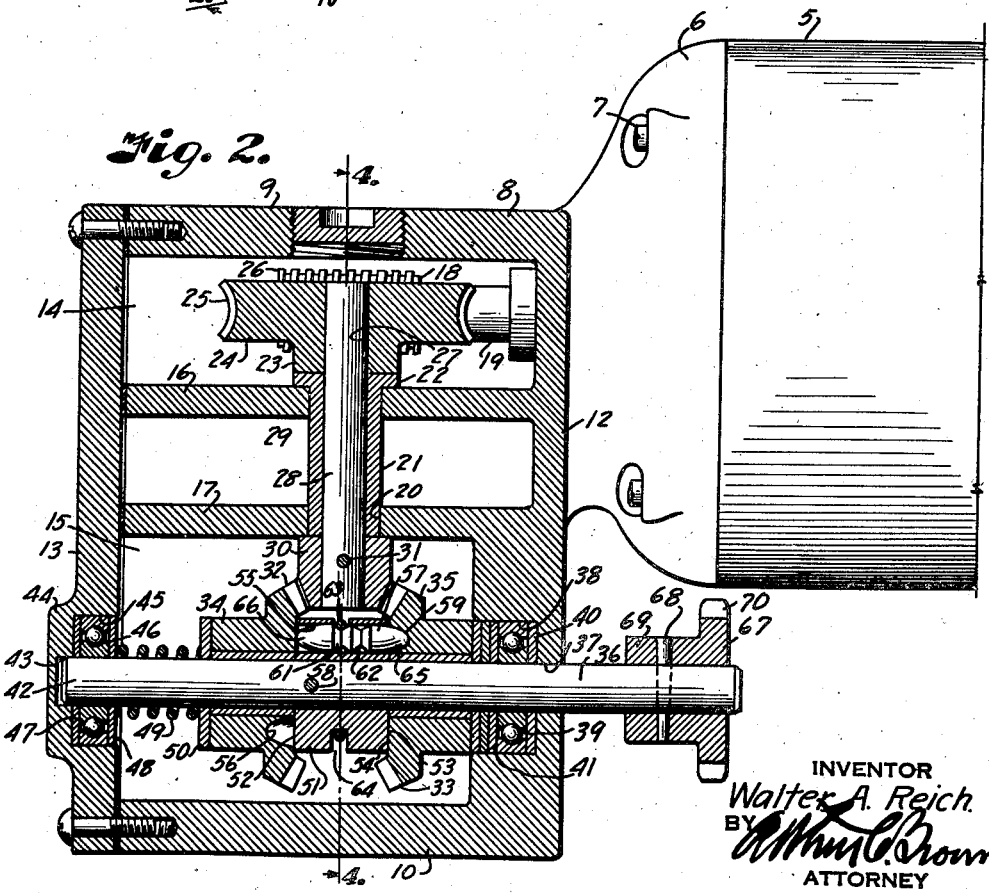
Fig. 2 is an enlarged vertical cross section through the gear box on the line 2—2, Fig. 1, the motor housing being shown in elevation.

In accomplishing this feature of the invention I have provided the clutch pin with a pair of spaced peripheral notches 61 and 62 midway of its length to form seating surfaces for a split wire spring 63 which is fitted into a peripheral groove 64 provided midway the length of the clutch collar. The spring 63 seats in the groove 64 and engages in one of the notches of the clutch pin to retain the pin in the bore 55 and one end of the pin in a recess of the beveled gears. For example, when the spring 63 is engaged in the notch 61, the rounded or cam end 65 of the clutch pin is held in a recess of the gear 35, as shown in Figs. 2 and 5.

The clutch collar is driven in one direction through engagement with, for example, the gear 35, and if resistance is encountered to rotation of the clutch collar, the pin will ride out of the recess in the gear 35 which remains in motion through its geared connection with the motor. The pin will be forced in the direction of the gear 34 for lodgment in a recess of that gear to thereafter rotate the clutch collar in the opposite direction.

As the clutch pin rides out of a recess in the gear 35, the spring engaging in the notch 61 is expanded to permit passage of the pin thereunder in such a manner that the notch 62 of the pin will be positioned directly under the spring, whereupon the spring contracts to engage the notch 62 to retain the pin out of engagement with the gear 35 and in engagement with the gear 34.

It would be a mere coincidence for a recess in the gear 34 to be directly opposite the end 66 of the clutch pin as it changes position and in order to assure engagement of the pin in said recess and also to prevent the pin from slipping back into a recess of the gear 35, the coil spring 49 is provided which normally retains the gear 34 in engagement with the pinion 30 but which is of less strength than the pressure exerted by the gear 35 in forcing the clutch pin against the face of the gear 34. It is apparent that as the pin is forced laterally toward the gear 34, the spring 49 is compressed to permit disengagement of the gear 34 and pinion 30 so that the clutch collar need make only a one-third, or less, revolution to align the clutch pin with a recess in the gear 34.

Immediately upon such alignment of the pin and recess, pressure of the spring 49 causes the gear 34 to reengage with the pinion 30 in such a manner that the clutch pin is engaged by and held in the recess by the spring 63 until further resistance is encounterd by the clutch collar, whereupon the position of the clutch pin is changed to the other gear to again change the direction of rotation of the clutch collar.

It may be here noted that the spring 49 is of greater strength than the spring 63 so that as resistance to rotation of the clutch collar is encountered, the position of the clutch pin is readily changed. The importance of the spring 49 is further apparent due to the fact that until the clutch pin, when changing position, aligns with a recess in the gear 35, the spring 49 is slightly contracted, due to pressure of the dislodged pin against the flat face of the gear, after which it provides the final impetus to the clutch pin, forcing the pin into its new position or recess.

Resistance to the rotation of the clutch collar is provided, as an example, by a power take-off sprocket 67 keyed to the outer end of the shaft 36 by a pin 68 extending transversely through the hub 69 of the sprocket 67 and through the shaft 36. The sprocket 67 is provided with teeth 70 which are engageable with links 71 of a chain or the like which, it is apparent, may be movable relative to the gearing mechanism, or vice versa.

Lugs 72 are also fixed to the chain at spaced points therealong for defining the limits of travel of the gear mechanism due to resistance to movement of the sprocket and consequent automatic reversing thereof.

In operating a device constructed as described, the motor is started, which rotates the worm 18 on the armature shaft, turning the gear 24, shaft 28 and pinion gear 30. The beveled gears 34 and 35 are always in engagement with the pinion gear 30 and are rotated thereby, the engagement of the gear 34 being due to pressure by the spring 49 thereagainst. The clutch collar 51 and the shaft 36 revolve with one of the gears due to the engagement effected by the rounded end of the clutch pin 57 seating in one of the recesses of the beveled gears.

As the power take-off sprocket moves along the chain in response to rotation of the driven shaft, should the sprocket meet an obstruction, for example, a bracket extending over the chain, a wall abutting the end of the chain, the hand of a person if it should hold the chain, or any similar obstruction, rotation of the sprocket in the same direction will tend to be stopped. With the beveled gears in motion and the clutch collar dragging because of resistance to rotation of the sprocket 67, the rounded surfaces of one of the recesses in, for example, the gear 35, will tend to slide down one of the rounded ends of the pin to push the pin from that recess. As the pin moves out of a recess under rotational pressure of the gear 35, the spring 63 is expanded to permit said movement of the pin, and the gear 34 is moved outwardly against the tension of the spring 49 to become disengaged from the pinion gear. Some movement will remain, however, in the gear so that a recess in the gear 34 is aligned with the lines of travel of the pin in such a manner that the end of the pin is engaged in the recess, after which the spring 63 will be retracted to engage the notch in the pin.

When the pin is in one of the recesses of the gear 34, the spring 49 exerts its pressure to re-engage the teeth of the pinion gear and gear 34 so that as the clutch collar again moves, it will be in the opposite direction to reverse the travel of the sprocket 67 on the chain to thereby prevent any injury to the machinery of the reverse gearing or to an object obstructing the path of the gear unit along the chain, a similar reversing action being provided when resistance is offered to rotation of the gears in the opposite direction.

From the foregoing it is apparent that I have provided an efficient and safe reversing gearing for changing the direction of the gear unit when the gear unit meets an obstruction in its path of travel. It is also apparent that obstructions may be methodically placed in the path of travel of the gear unit to provide a reciprocating unit movable within well defined limits.

What I claim and desire to secure by Letters Patent is:

1. In a device of the character described, a power driven rotatable shaft, a shaft having driven engagement with said first named shaft and having a pinion, a shaft having a clutch thereon, gears mounted on the last named shaft engageable with the clutch and engaging the pinion of the second named shaft, and a clutch pin slidable in the clutch and having alternate cam engagement with one of the gears to effect reciprocation of the pin into engagement with the other gear for alternately reversing direction of rotation of the last named shaft.

2. In a device of the character described, a power driven rotatable shaft, a shaft having driven engagement with said first named shaft and having a pinion, a shaft having a clutch thereon, gears mounted on the last named shaft engageable with the clutch and engaging the pinion of the second named shaft, a clutch pin slidably mounted in the clutch having alternate cam engagement with one of the gears to effect reciprocation of the pin into engagemnt with the other gear for alternately reversing direction of rotation of the last named shaft, and means for resiliently retaining one of said gears in engagement with the pinion after shifting of said clutch pin.

3. In a device of the character described, a power driven rotatable shaft, a shaft having driven engagement with said first named shaft and having a pinion, a shaft having a clutch thereon, gears mounted on the last named shaft engageable with the clutch and engaging the pinion of the second named shaft, a clutch pin slidably mounted in the clutch having alternate cam engagement with one of the gears to effect reciprocation of the pin into and out of engagement with the other gear for alternately reversing direction of rotation of the last named shaft, means for resiliently retaining one of said gears in engagement with the pinion, and means for resiliently retaining the clutch pin in engagement with the respective gears.

4. In a device of the character described, a power driven rotatable shaft, a shaft having driven engagement with said first named shaft and having a pinion, a shaft having a clutch thereon, gears mounted on the last named shaft engageable with the clutch and engaging the pinion of the second named shaft, a clutch pin slidably mounted in the clutch having alternate engagement with one of the gears to effect reciprocation of the pin into and out of engagement with the other gear for alternately reversing direction of rotation of the last named shaft, means for resiliently retaining one of said gears in engagement with the pinion, means for resiliently retaining the clutch pin in engagement with the respective gears, a power take-off for the last named shaft including a sprocket, a guide chain for the sprocket, and a lug on the guide chain for resisting travel of the sprocket for loading the clutch to cause shifting of the clutch pin responsive to continued rotation of the gear engaged by said pin.

5. In a device of the character described, a power driven rotatable shaft having a worm, a shaft having a worm gear at one end engageable with the worm and a pinion at its other end, a shaft having a clutch collar, gears mounted on the last named shaft engageable with the clutch collar and engaging the pinion of the second named shaft, the gears having recesses in their inner faces, means in the collar respectively engageable in the recesses of the gears for alternately reversing direction of rotation of the last named shaft, means for resiliently retaining one of said gears in engagement with the pinion, and a housing for enclosing said gears.

6. In a device of the character described, a power driven rotatable shaft having a worm, a shaft having a worm gear at one end engageable with the worm and a pinion at its other end, a second shaft, a clutch collar mounted on said second named shaft and having a transverse bore and a peripheral groove, gears mounted on the last named shaft engageable with the clutch collar and engaging the pinion of the second named shaft, the gears having recesses in their inner faces, a clutch pin slidable in the bore of the collar and having a pair of notches and respectively engageable with the recesses of the gears for alternately reversing direction of rotation of the last named shaft, and means in the groove engaging the notches of the pin for retaining said pin in selective engagement with said recesses of the respective gears.

7. In a device of the character described, a power driven rotatable shaft having a worm, a shaft having a worm gear at one end engageable with the worm and a pinion at its other end, a second shaft, a clutch collar mounted on said second named shaft and having a transverse bore and a peripheral groove, gears mounted on the last named shaft engageable with the clutch collar and engaging the pinion of the second named shaft, the gears having recesses in their inner faces, a clutch pin slidable in the bore of the collar and having a pair of notches and respectively engageable with the recesses of the gears for alternately reversing direction of rotation of the last named shaft, means in the groove engaging the notches of the pin for retaining said pin in selective engagement with said recesses of the respective gears, and means for resiliently retaining one of the gears in engagement with the pinion.

8. In a device of the character described, a driving member, spaced driven members having driving engagement with said driving member, a driven mechanism, clutch means having driving connection with the driven mechanism, projecting means on said clutch means having alternate driving engagement with the driven members, interengageable cooperative means on said driven members respectively for effecting said alternate driving engagement in response to increase of resistance to motion of the driven mechanism, and means for effecting said increased resistance.

9. In a device of the character described, a rotating driving member, spaced driven members engaged with said driving member for rotation therewith having bevelled recesses therein, a driven member mounting said spaced driven members, a clutch collar on said driven member between said spaced driven members, a clutch member in the collar having cam ends engageable in the bevelled recesses of either of the spaced driven members for effecting rotation of said clutch collar in alternate opposite directions, and means engageable with said driven member for intermittently impeding rotation of said clutch collar to shift the clutch member from the bevelled recess of one gear to the bevelled recess of the other gear in response to relative movement between said spaced driven members and clutch collar, whereby said clutch collar rotation in alternate opposite directions is effected.

10. In a device of the character described, a driving member, spaced driven members having driving engagement with said driving member, a driven mechanism, clutch means having driving connection with said driven mechanism, projecting means on said clutch means having alternate driving engagement with the driven members, and interengageable cooperative means on said driven members respectively for effecting said alternate driving engagement in response to resistance to motion of the driven mechanism.

11. A gear unit of the character described including a driving member, driven members operatively connected with said driving member for movement in opposite directions, a power-take-off member, a clutch member operatively connected with said power-take-off member respectively engageable with said driven members for driving said power-take-off member in opposite directions, and cooperative interengageable cam means forming part of said driven and clutch members respectively, said cooperative means being engageable with each other in response to relative movement between said power-take-off and driven members for shifting said clutch member from one to the other of said driven members whereby intermittent automatic reverse movement of said power-take-off member is effected.

12. In a device of the character described, a driving gear, driven gears meshing with the driving gear, a driven member rotatably mounting the driven gears, means for selectively connecting the driven gears in driving relation with the driven member including a clutch member keyed to the driven member, means carried by the clutch member alternately engageable with the respective driven gears, interengageable cooperative cam means on said driven gears and alternately engageable means respectively for effecting said alternate engagement incidental to arrest of said driven member, and means for intermittently arresting said driven member.

13. In a device of the character described, a driving gear, driven gears meshing with the driving gear, a driven member rotatably mounting the driven gears, means for selectively connecting the driven gears in driving relation with the driven member including a clutch member keyed to the driven member, means carried by the clutch member alternately engageable with the respective driven gears, interengageable cooperative cam means on said driven gears and alternately engageable means respectively for effecting said alternate engagement incidental to arrest of said driven member, means for intermittently arresting of said driven member, and means yieldably retaining one of the driven gears in meshing engagement with the driving gear.

WALTER A. REICH.